(12) United States Patent
Lim et al.

(10) Patent No.: US 8,159,762 B2
(45) Date of Patent: Apr. 17, 2012

(54) LENS ACTUATING MODULE

(75) Inventors: Soo Cheol Lim, Gyunggi-do (KR); Byung Hoon Kang, Seoul (KR); Chul Yeub Han, Gyunggi-do (KR); Jung Wook Hwang, Gyunggi-do (KR); Hyun Phill Ko, Gyunggi-do (KR); Jae Hyuk Park, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 279 days.

(21) Appl. No.: 12/684,759

(22) Filed: Jan. 8, 2010

(65) Prior Publication Data

US 2011/0091193 A1 Apr. 21, 2011

(30) Foreign Application Priority Data

Oct. 19, 2009 (KR) .................. 10-2009-0099342

(51) Int. Cl.
*G02B 7/02* (2006.01)

(52) U.S. Cl. ...................................... 359/823

(58) Field of Classification Search .................. 359/676, 359/694, 823
See application file for complete search history.

(56) References Cited

U.S. PATENT DOCUMENTS 7,295,389 B2 * 11/2007 Ohtsuka et al. .............. 359/819

FOREIGN PATENT DOCUMENTS

| KR | 2006-058897 | 3/2006 |
| KR | 2009-103421 | 10/2009 |

OTHER PUBLICATIONS

Office Action from counterpart Korean Patent Application No. 10-2009-0099342, Jan. 14, 2011, 3 pages.

* cited by examiner

*Primary Examiner* — Joseph P Martinez
(74) *Attorney, Agent, or Firm* — Blakely Sokoloff Taylor & Zafman LLP (57) ABSTRACT

A lens actuating module. The module includes a housing and a lens barrel. received in an accommodating space of the housing and having a lens therein. A driving unit applies a driving force to the lens barrel such that the barrel can be moved up in an optical axis direction by a pulling force of contraction of an SMA (shape memory alloy) wire fixed to the housing. A rotary member is interposed between the housing and the lens barrel. A preload unit pulls the lens barrel in the optical axis direction such that the lens barrel can move down to an original position, and pulls the lens barrel in a direction perpendicular to the optical axis to maintain a contact of the lens barrel with the rotary member. The lens barrel is moved by the contracted or extended amount of the SMA wire, thus realizing a simple structure and miniaturization.

11 Claims, 10 Drawing Sheets

FIG.1

Prior art

FIG.2

Prior art

LENS ACTUATING MODULE

CROSS REFERENCE TO RELATED APPLICATION(S)

This application claims the benefit of Korean Patent Application No. 10-2009-0099342, filed on Oct. 19, 2009, entitled "Lens Actuating Module", which is hereby incorporated by reference in its entirety into this application.

BACKGROUND OF THE INVENTION

1. Technical Field

The present invention relates to a lens actuating module.

2. Description of the Related Art

Generally, personal portable terminals, such as an electronic device, a mobile phone or a PDA, have additional functions as well as a main function. Currently, many electronic devices additionally have a camera function, so that they appeal to consumers. Thus, a market for camera modules mounted on the electronic devices having the camera function has been gradually expanding.

In order to satisfy the demand of the market, the camera module has been developed to have additional functions including an auto-focusing function, an optical zoom function, and an Optical Image Stabilization (OIS) function, in addition to a fixed focus function.

Especially, in order to realize the additional functions of the camera module including the auto-focusing function, the optical zoom function, and the OIS function, a lens transfer module using an actuator for transferring a lens, for example, an actuator of a step motor type, a Voice Coil Motor (VCM) type, or a piezoelectric type is essentially required. In recent years, as the personal portable terminals require the composition of multiple functions and miniaturization, the camera module applied to the personal portable terminal mainly uses the piezoelectric type which is advantageous in terms of miniaturization and reliability.

Figure 1:
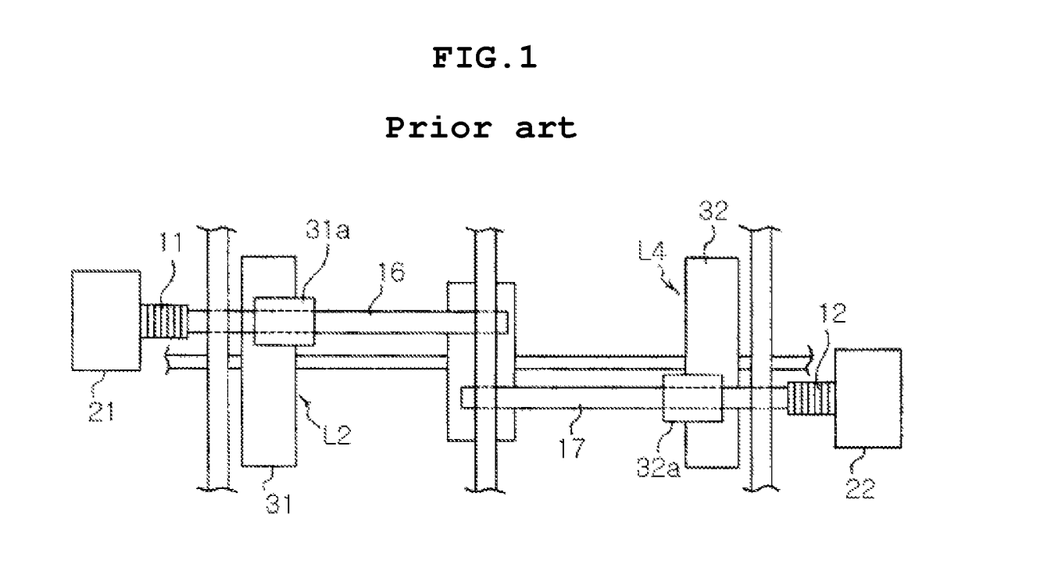
FIG. 1 is a sectional view illustrating the construction of a conventional lens actuating module using piezoelectric devices.
Figure 2:
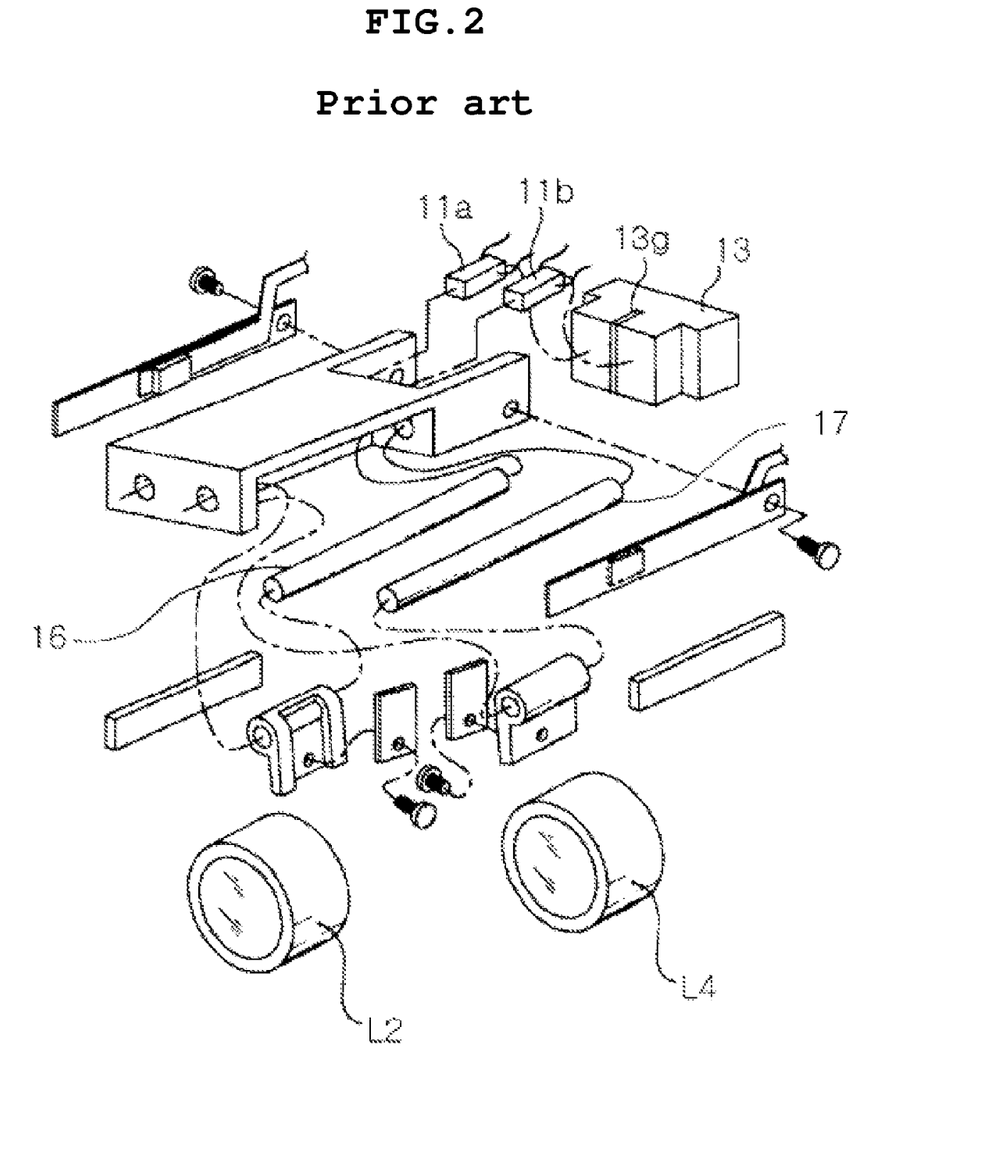
FIG. 2 is an assembly view of the lens actuating module of FIG. 1.

FIG. 1 is a view showing the construction of a conventional lens actuating module using piezoelectric devices. FIG. 2 is an assembly view of the lens actuating module of FIG. 1.

As shown in FIG. 1, in the conventional lens actuating module using piezoelectric devices, the piezoelectric devices 11 and 12 are fixed to respective base blocks 21 and 22 and displacements of the piezoelectric devices 11 and 12 are transmitted to respective driving rods 16 and 17, so that lenses L2 and L4 can be moved by preload generated from slide parts 31a and 32a, inertia force of lens holders 31 and 32, and acceleration effect. According to the waveforms of voltages applied to the piezoelectric devices 11 and 12, the lens holders may move along with the driving rods or slide to stay in places, so that the lenses can be moved. Further, the lenses may be transferred in opposite directions.

When the lens actuating module of FIG. 1 is arranged to form the arrangement shown in FIG. 2, displacement of one of the piezoelectric devices 11a and 11b which are arranged to be adjacent to each other may be transmitted to the other piezoelectric device through a base block 13. In the above state, the displacement may be undesirably transmitted to another lens.

Thus, a groove 13g is formed in the base block 13 so as to prevent the transmission of displacement between piezoelectric devices 11a and 11b. However, the groove 13g complicates the structure, causes the lens actuating module to be difficult to manufacture, and cannot completely solve displacement interference between the piezoelectric devices 11a and 11b.

Further, the length of each driving rod 16, 17 which is moved forwards and backwards by an associated piezoelectric device 11a, 11b so as to move the lens is limited by the size of the piezoelectric device. The length restriction of the driving rods 16 and 17 limits the lens transfer length, so that it negatively affects the performance of a product.

Since the driving rods 16 and 17 are fixed, it is impossible to change the length of a barrel in which the lenses are held. In addition to a space for the lens transfer length, an additional space for receiving driving elements is required, so that it is difficult to realize the miniaturization of an entire module. Further, each lens is supported at only one end thereof by an associated driving rod 16 or 17, so that, when the lens actuating module is driven, the lens may have asymmetric displacement, thus leading to unstable driving.

SUMMARY OF THE INVENTION

The present invention is intended to provide a lens actuating module, in which a lens barrel in a camera module is moved by the contracted or extended amount of a Shape Memory Alloy (SMA) wire, thus realizing a simple structure and miniaturization.

In one aspect of the present invention, there is provided a lens actuating module comprising a housing having an accommodating space, a lens barrel received in the accommodating space and including a lens, a driving unit applying a driving force such that the lens barrel can be moved up in the direction of an optical axis, by a pulling force of contraction of a SMA wire locked at both ends thereof to the housing, a rotary member interposed between the housing and the lens barrel, and a preload unit pulling the lens barrel in the direction of the optical axis such that the lens barrel can be moved down to an original position, and pulling the lens barrel in a direction perpendicular to the optical axis such that a contact of the lens barrel with the rotary member can be maintained.

The preload unit may comprise an elastic member which is placed obliquely, with a first end thereof being locked to an inner circumference of the housing and a second end being locked to an outer circumference of the lens barrel.

The preload unit may include a magnet provided on the inner circumference of the housing, and a yoke provided on the outer circumference of the lens barrel which faces the inner circumference of the housing and having a center which is different from the magnet in the direction of the optical axis, with a magnetic attractive force acting between the magnet and the yoke.

Further, the preload unit may include a magnet provided on the inner circumference of the housing, a yoke provided on the outer circumference of the lens barrel which faces the inner circumference of the housing and having a center which is equal to or different from the magnet in the direction of the optical axis, with a magnetic attractive force acting between the magnet and the yoke, and an elastic member protruding from an upper surface of the lens barrel.

The elastic member may be a coil spring or a plate spring.

Further, a crimp may be locked to an outer circumference of the housing and the SMA wire may be connected at both ends thereof to the crimp which supplies an electric current to the SMA wire.

A barrel guide part may protrude from the outer circumference of the lens barrel, and a housing guide part may be provided on the inner circumference of the housing and engage with the barrel guide part so as to guide insertion and vertical actuation of the lens barrel.

Further, the barrel guide part may comprise a plurality of barrel guide parts, and the housing guide part may comprise a plurality of housing guide parts.

The housing guide part may include a rotary member receiving hole to receive a rotary member, and the barrel guide part may be actuated in the direction of the optical axis by the driving force of the driving unit while the barrel guide part is in contact with the rotary member.

A barrel hook may be provided on the outer circumference of the lens barrel and part of the SMA wire between both ends thereof may be arranged to support the barrel hook.

Further, the rotary member may be a guide ball.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the terms to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention might obscure the gist of the present invention, the detailed description thereof will be omitted.

Hereinafter, the preferred embodiments of the present invention will be described in detail with reference to the accompanying drawings.

Lens Actuating Module—First Embodiment

Figure 3:
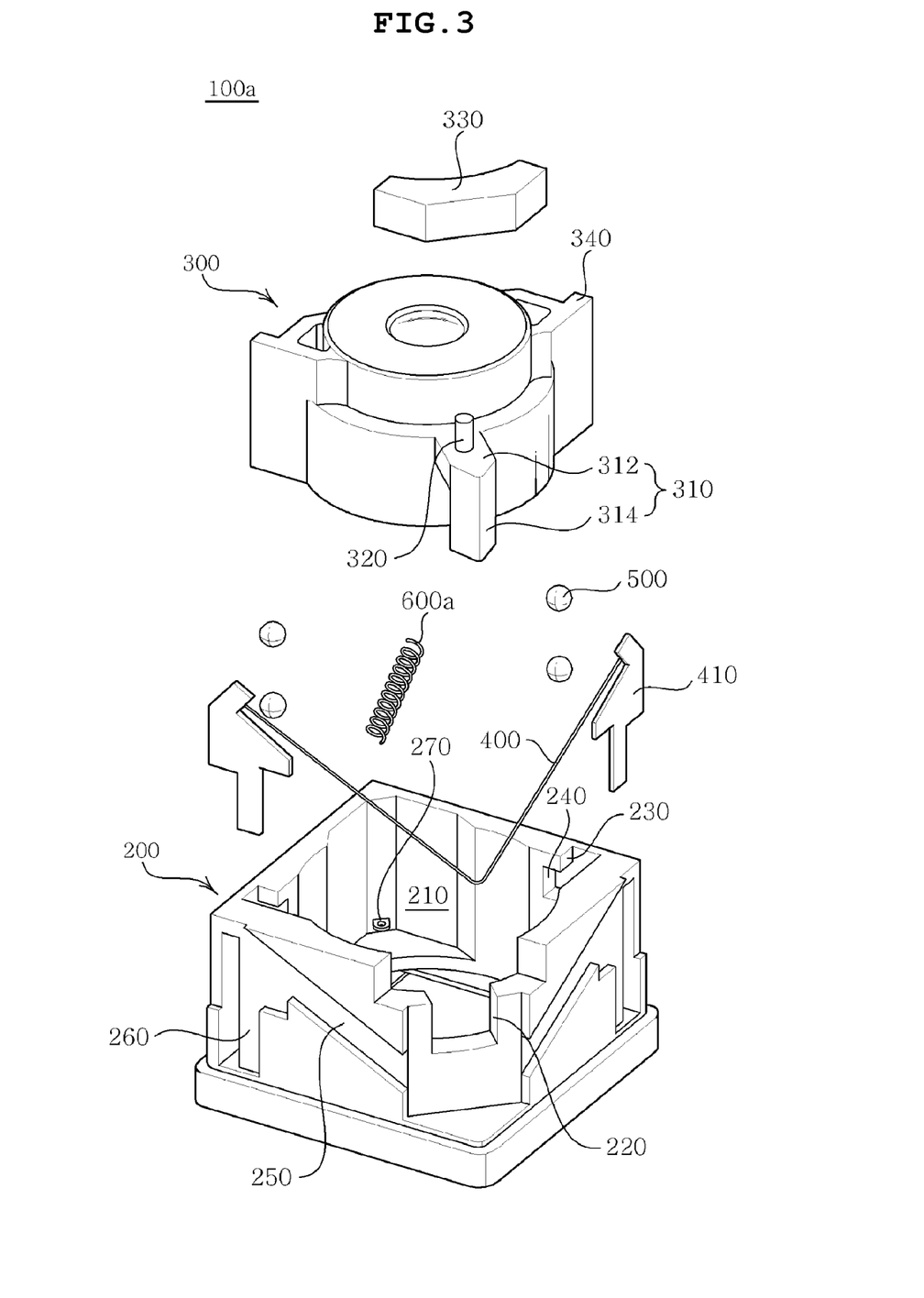
FIG. 3 is an exploded perspective view illustrating a lens actuating module according to a first embodiment of the present invention.
Figure 4:
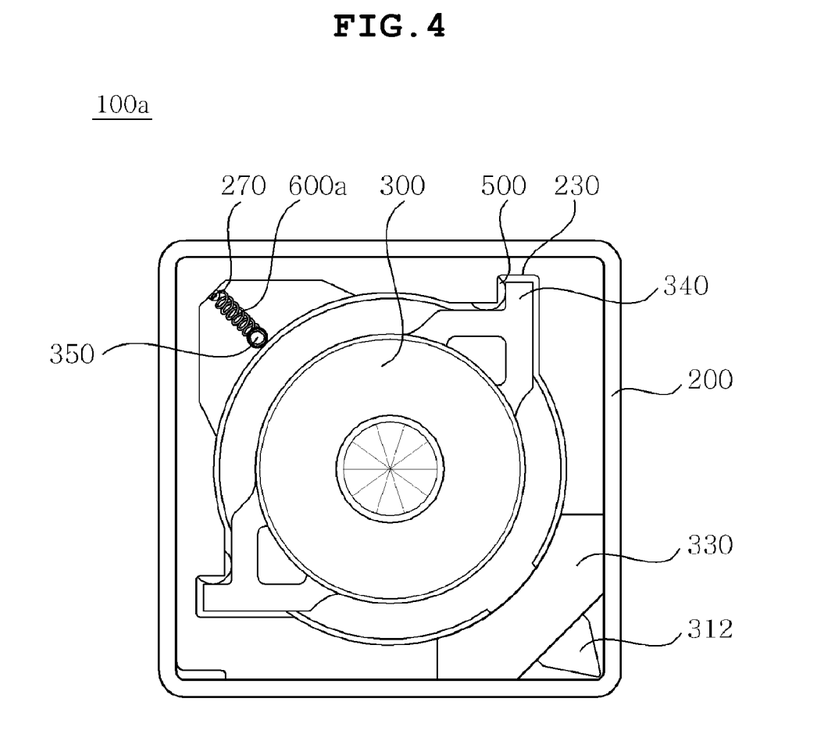
FIG. 4 is a plan view illustrating the assembled state of the lens actuating module of FIG. 3.
Figure 5:
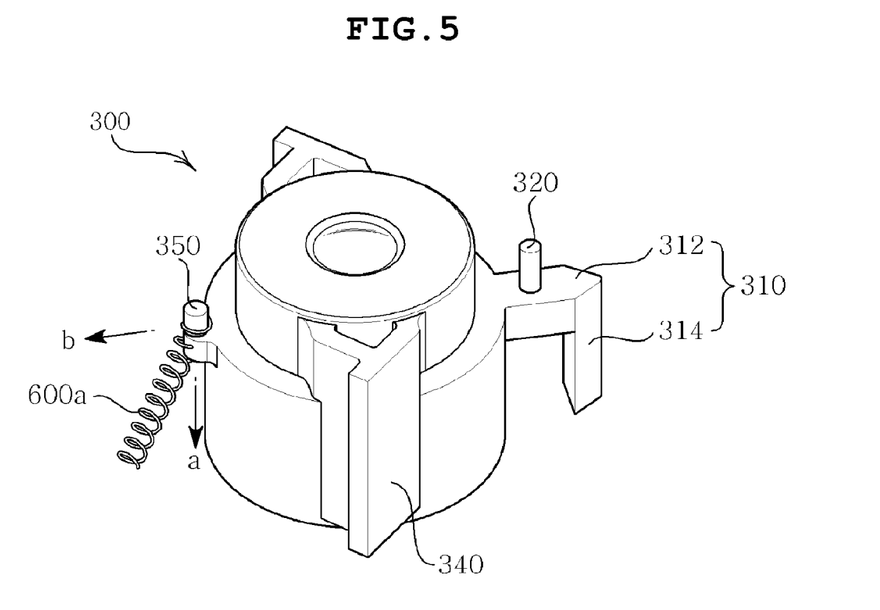
FIG. 5 is a perspective view illustrating the assembled state of a preload unit relative to a lens barrel of the lens actuating module of FIG. 3.

FIG. 3 is an exploded perspective view illustrating a lens actuating module according to a first embodiment of the present invention. FIG. 4 is a plan view illustrating the assembled state of the lens actuating module of FIG. 3. FIG. 5 is a perspective view illustrating the assembled state of a preload unit relative to a lens barrel of the lens actuating module of FIG. 3. Hereinafter, the lens actuating module 100a according to this embodiment will be described with reference to the accompanying drawings.

As shown in FIGS. 3 to 5, the lens actuating module 100a according to the first embodiment includes a housing 200, a lens barrel 300 installed in the housing 200, a driving unit for actuating the lens barrel 300 in the direction of an optical axis using a Shape Memory Alloy (SMA) wire 400, rotary members 500, and a preload unit 600a.

The housing 200 serves to provide a space for receiving the lens barrel 300 therein, and is constructed so that its upper end is open and an accommodating space 210, having a shape corresponding to the contour of the lens barrel 300 such that the lens barrel 300 can be closely fitted in the accommodating space 210 and supported therein, is defined in the central portion of the housing 200.

One corner of the housing 200 is formed to be stepped downwards, thus providing an open part 220 which is open at its upper portion. The open part 220 provides a space for vertically actuating a barrel hook 310, which protrudes from the outer circumference of the lens barrel 300, in a state in which the barrel hook 310 is exposed outside the housing 200.

Further, a housing guide part 230 is provided on the inner circumference of the housing 200 and engages with a barrel guide part 340 which is provided on the outer circumference of the lens barrel 300 so as to guide the insertion of the lens barrel 300 into the housing 200 and prevent the leaning and rotation of the lens barrel 300 relative to the housing 200 when it is inserted into the housing 200 and is actuated vertically. For example, the housing guide part 230 has the structure of a groove which can receive the barrel guide part 340 protruding from the outer circumference of the lens barrel 300. In the embodiment, one pair of housing guide parts 230 is provided to face each other in a diagonal direction so as to prevent the leaning and rotation of the lens barrel 300 in the housing 200. For example, the housing guide parts 230 are provided on opposite corners which are placed in a direction of crossing the corner of the housing 200 having the open part 220. However, the structure and arrangement of the housing guide parts 230 are exemplary for reliably guiding the lens barrel 300 and may be changed as long as the housing guide parts 230 can perform the same function. The change of the housing guide parts 230 also falls within the scope of the present invention. Further, rotary member receiving holes 240 for receiving the rotary members 500 are formed in respective housing guide parts 230. The rotary members 500 reduce friction with the barrel guide parts 340 provided on the lens barrel 300, thus helping the vertical movement of the lens barrel 300. The rotary member receiving holes 240 will be described in detail when describing the rotary members 500 later herein.

Further, a housing locking part 270 is provided on the inner circumference of the housing 200 and functions to lock one end of the preload unit 600a. In the embodiment, the housing locking part 270 is placed in the lower end of a corner of the housing 200 which faces the corner of the housing 200 having the open part 220 in a diagonal direction.

Meanwhile, wire guide channels 250 and crimp locking grooves 260 are formed in the outer circumference of the housing 200. Each wire guide channel 250 is formed in the shape of a stepped part so as to limit the moving range of the SMA wire 400. Each crimp locking groove 260 locks a crimp 410, to which one end of the SMA wire 400 is connected and receives electric power from the crimp 410. Here, the wire guide channels 250 are formed such that the channels 250 are inclined upwards from the lower end of the corner of the housing 200 having the open part 220 to both sides of the housing 200. Further, the crimp locking grooves 260 are formed on both sides of the housing 200 having the wire guide channels 250 in such a way that each crimp locking groove 260 has a shape corresponding to that of the crimp 410. The wire guide channels 250 and the crimp locking grooves 260 may be variously designed in consideration of the number and arrangement of the SMA wire 400 which is used.

The lens barrel 300 brings an image of a subject into a camera module through a lens, and comprises a hollow cylindrical lens holder having an accommodating space of a predetermined size such that at least one lens is arranged in the optical axis.

Here, the lens barrel 300 has at a predetermined position on its outer circumference the barrel hook 310 which engages with the SMA wire 400 such that an actuating force is transmitted to the lens barrel 300 in the direction of the optical axis. The barrel hook 310 comprises a support arm 312, which extends radially outwards from a predetermined portion of the upper end of the lens barrel 300 to a predetermined length, and a hook part 314, which extends downwards from the outer end of the support arm 312 to a predetermined length. The SMA wire 400 is hooked by the lower end of the hook part 314 and receives the actuating force from the SMA wire 400. Here, the lens barrel 300 is received in the housing 200 such that one side of the lens barrel 300 having the barrel hook 310 is aligned with the corner of the housing 200 having the open part 220 and the barrel hook 310 is exposed outside the housing 200 through the open part 220. A protrusion 320 is provided on the upper end of the support arm 312. When the lens barrel 300 moves along the optical axis, the protrusion 320 is stopped by a stopper 330 provided on the upper end of the housing 200 or in a casing (not shown), so that the moving range of the lens barrel 300 can be limited. Thus, due to the protrusion 320, the lens barrel 300 can be prevented from being removed from the housing 200 by external shock or from being excessively moved by the SMA wire 400.

In the embodiment, the barrel guide parts 340 are provided on the outer circumference of the lens barrel 300 to engage with respective housing guide parts 230 of the housing 200. The barrel guide parts 340 slidably engage with respective housing guide parts 230, thus helping the insertion and vertical actuation of the lens barrel 300 and preventing the leaning and rotation of the lens barrel 300 in the housing 200. The barrel guide parts 340 are formed at locations corresponding to the housing guide parts 230 such that the barrel guide parts 340 engage with the housing guide parts 230. For example, the barrel guide parts 340 may protrude from the outer circumference of the lens barrel 300 such that the barrel guide parts 340 engage with the housing guide parts 230 having the structure of a groove. In the state where the barrel guide parts 340 engage with the housing guide parts 230, the barrel guide parts 340 are in slidable contact with the rotary members 500, thus allowing the lens barrel 300 to be actuated up and down under the condition of reduced frictional force.

Meanwhile, a barrel locking part 350 is provided on the outer circumference of the lens barrel 300. In the embodiment, the barrel locking part 350 is placed at a position on the outer circumference of the lens barrel 300 diagonally facing the position of the lens barrel 300 having the barrel hook 310. The second end of the preload unit 600a which will be described later is locked to the barrel locking part 350.

The driving unit functions to apply an actuating force to the lens barrel 300 using the contraction and extension of a shape memory alloy. The driving unit controls the actuating displacement of the lens barrel 300 using a rise in temperature and thermal condensation/cold expansion characteristics generated by an electric current applied to the SMA wire 400.

In the state where both ends of the SMA wire 400 are secured to the outer circumference of the housing 200, a part of the SMA wire 400 between both ends is caught on the lens barrel 300. In the embodiment, the part of the SMA wire 400 between both ends is caught on the barrel hook 310. When electric power is applied to the SMA wire 400, the SMA wire 400 contracts, thus applying an actuating force to the lens barrel 300. At this time, both ends of the SMA wire 400 are connected to the crimps 410 supplying the electric current and are locked to the outer circumference of the housing 200. The locking and connecting method is not limited to a specific method, and a variety of methods including adhesion, welding and clamping may be used. Meanwhile, referring to the drawings, the electric current is supplied to the SMA wire 400 using the crimps 410. But, a power supply structure and a conductive connection method are not limited to a specific structure and a specific connection method, and may be achieved by known related art.

Before current is supplied to the SMA wire 400, the SMA wire 400 maintains an extended state and the lens barrel 300 is placed at the lower end of the housing 200, that is, an initial position. When current is supplied by the crimps 410, the SMA wire 400 is contracted by rising temperature generated by its own resistance heat, so that the lens barrel 300 is moved up in the direction of the optical axis by the pulling force of the contraction. Subsequently, when the current is cut off, the pulling force of the contraction of the SMA wire 400 is removed, and the preload unit 600a provides a restoring force to the lens barrel 300 in a direction opposite to that of the pulling force, so that the lens barrel 300 returns to its original position. In the above state, due to the restoring force, the SMA wire 400 is extended by a predetermined amount. Meanwhile, the operation of the preload unit 600a will be described below in detail.

The rotary members 500 are interposed between the housing 200 and the lens barrel 300 to reduce a frictional force between the lens barrel 300 and the housing 200 by rotary motion, thus enabling the lens barrel 300 to be easily actuated in a vertical direction. Each rotary member 500 comprises a guide ball which reduces a contact area to minimize the frictional force.

Here, the rotary member 500 is rotatably supported with a part of each rotary member 500 being received in the corresponding rotary member receiving hole 240 formed in the inner circumference of the housing 200. A remaining part of the rotary member 500 is in contact with and supported by the barrel guide part 340 of the lens barrel 300, thus aiding in actuating the barrel guide part 340 vertically. In the above state, the barrel guide part 340 is in contact with and supported by the rotary member 500, thus allowing the lens barrel 300 to be actuated in a straight line while preventing the leaning of the lens barrel 300.

In order to maintain the contact of the rotary member 500 with the barrel guide part 340, a force must be applied to the barrel guide part 340 towards the rotary member 500, that is, in a direction 'b' perpendicular to the optical axis. The preload unit 600a which will be described below applies a force to the lens barrel 300 in the direction 'b' perpendicular to the optical axis. This will be described in detail when describing the preload unit 600a.

Meanwhile, referring to the drawings, the rotary member receiving holes 240 are formed in the inner circumference of the housing 200. But, another structure in which the rotary member receiving hole 240 is formed in the barrel guide part 340 such that a part of the rotary member 500 is rotatably supported by the barrel guide part 340 and a remaining part is supported by the housing guide part 230 may be used. Such a structure also falls within the scope of the present invention.

The preload unit 600a provides a restoring force such that the lens barrel 300 moved upwards is restored to its original position, and functions to maintain the contact of the lens barrel 300 with the rotary members 500. The preload unit 600a comprises a spring member which is placed obliquely such that one end is connected to the housing locking part 270 provided on the inner circumference of the housing 200 and the other end is connected to the barrel locking part 350 provided on the outer circumference of the lens barrel 300.

That is, the spring member placed obliquely provides a restoring force for moving the lens barrel 300 down, and pulls the lens barrel 300 in a direction 'a' opposite to that of the pulling force of contraction of the SMA wire 400, that is, in the optical axis direction 'a' towards a lower position. Further, the spring member provides a force for pulling the lens barrel 300 towards the rotary members 500 in the direction 'b' perpendicular to the optical axis direction 'a' such that the lens barrel 300 is in contact with the rotary members 500.

A coil spring may be used as the spring member. By obliquely placing the spring member, bi-directional forces are realized only by a single spring member.

Lens Actuating Module—Second Embodiment

Figure 6:
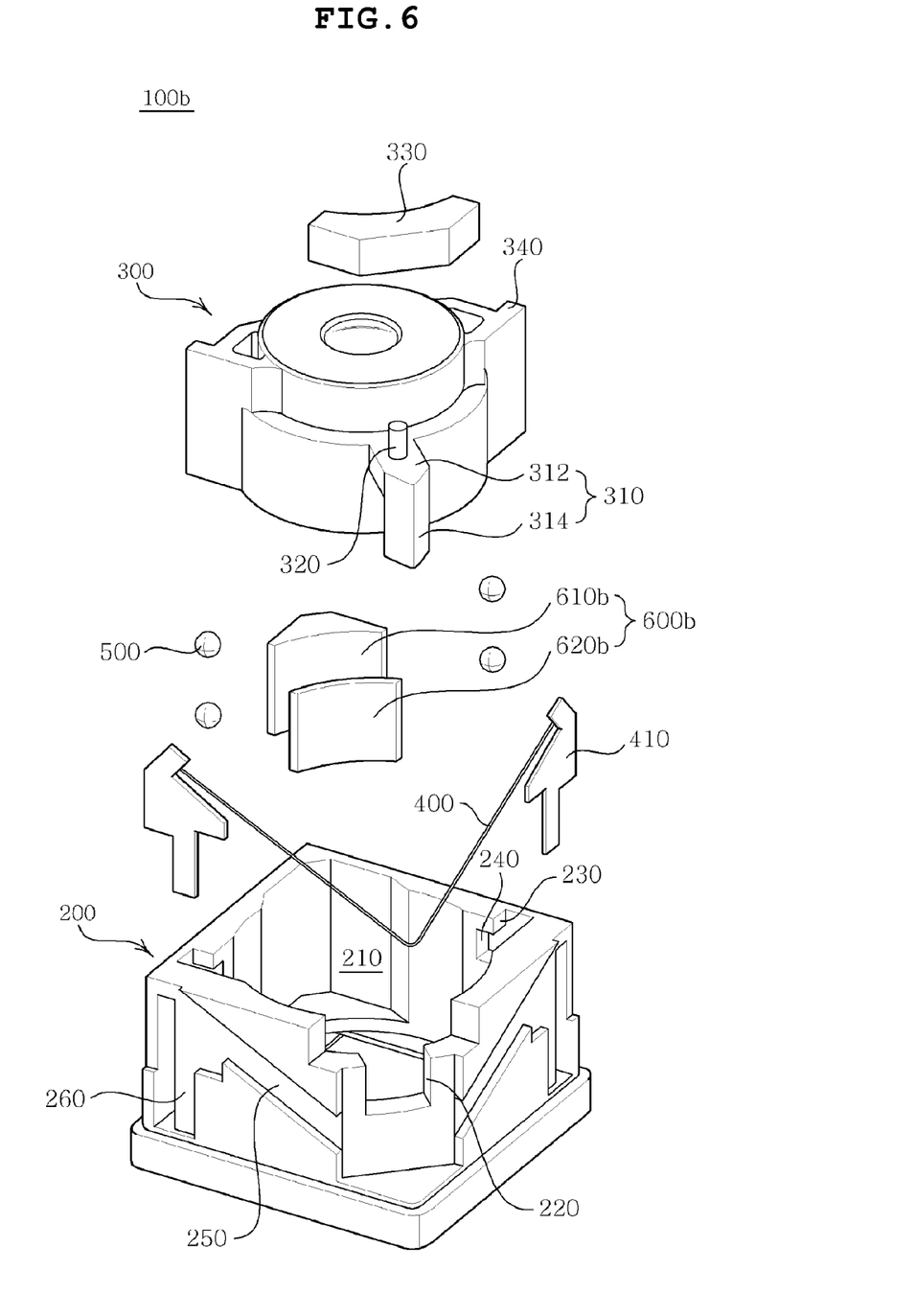
FIG. 6 is an exploded perspective view illustrating a lens actuating module according to a second embodiment of the present invention.
Figure 7:
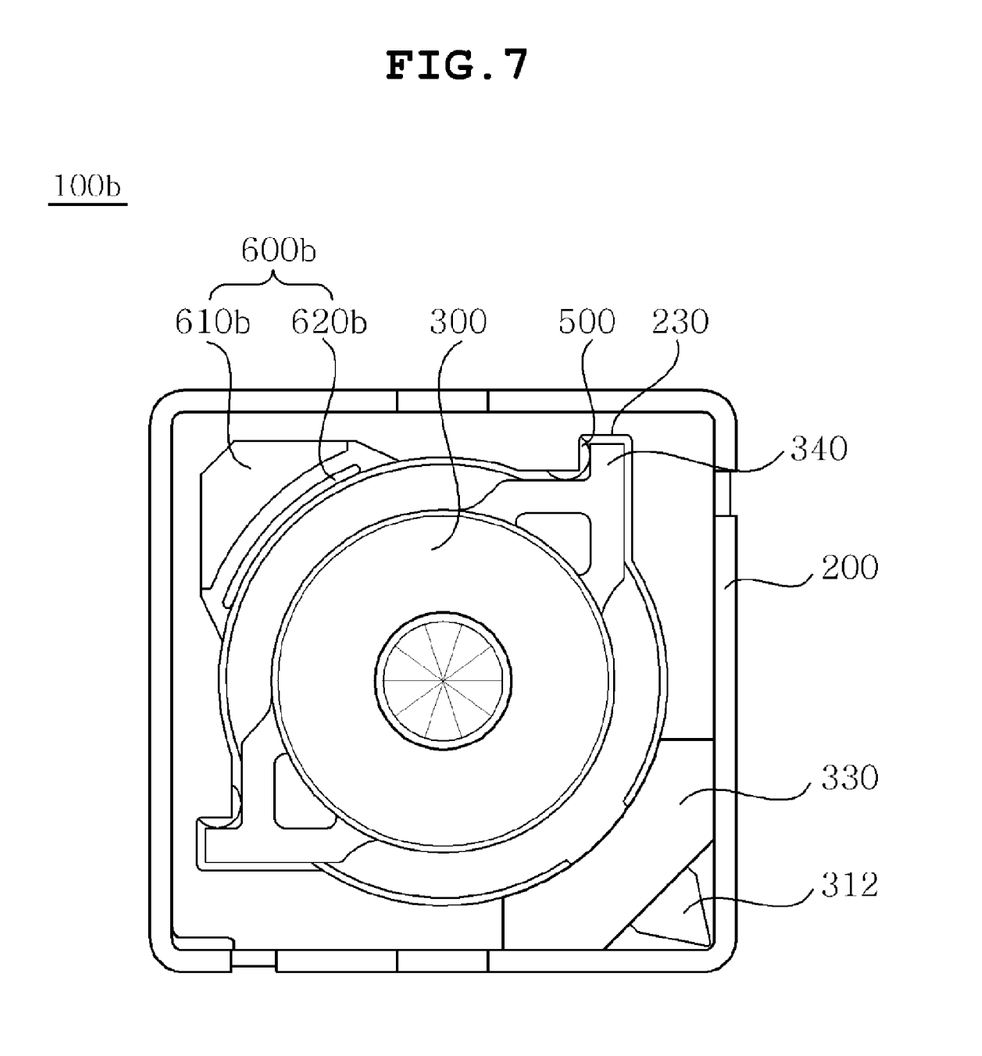
FIG. 7 is a plan view illustrating the assembled state of the lens actuating module of FIG. 6.
Figure 8:
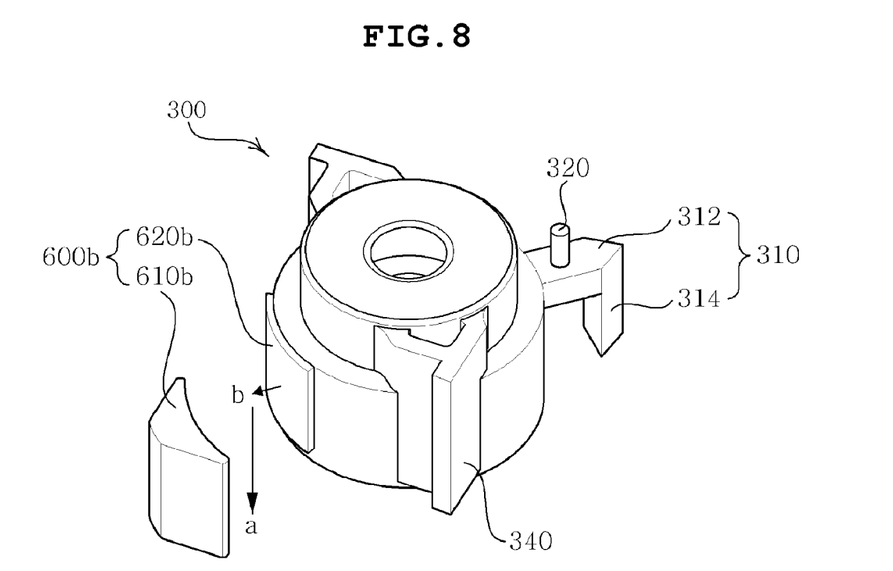
FIG. 8 is a perspective view illustrating the assembled state of a preload unit relative to a lens barrel of the lens actuating module of FIG. 6.

FIG. 6 is an exploded perspective view illustrating a lens actuating module according to a second embodiment of the present invention, FIG. 7 is a perspective view illustrating the assembled state of the lens actuating module of FIG. 6, and FIG. 8 is a perspective view illustrating the assembled state of a preload unit relative to a lens barrel of the lens actuating module of FIG. 6. Since the second embodiment is identical with the first embodiment except for the construction of a preload unit 600b, elements common to both the embodiments will carry the same reference numerals and duplicate descriptions will be omitted herefrom. Hereinafter, a lens actuating module 100b according to this embodiment will be described with reference to the accompanying drawings.

As shown in FIGS. 6 to 8, the preload unit 600b of the lens actuating module 100b according to the second embodiment uses the magnetic attractive force of a magnet 610b and a yoke 620b. In the preload unit 600b, the magnet 610b and the yoke 620b are arranged such that they have respective centers which are different from each other in the direction of the optical axis, so that the magnet 610b and the yoke 620b apply a force of pulling the lens barrel 300 down in an optical axis direction 'a', that is, a direction opposite to that of the pulling force of contraction of the SMA wire 400 and apply a force of pulling the lens barrel 300 toward the rotary members 500 in a direction 'b' perpendicular to the optical axis direction 'a' such that the lens barrel 300 contacts the rotary members 500.

Here, the magnet 610b is provided on the inner circumference of the housing 200. The yoke 620b is provided on the outer circumference of the lens barrel 300 facing the inner circumference of the housing 200. In the present invention, the locations of the magnet 610b and the yoke 620b may be changed with each other and the change in the locations also falls within the scope of the present invention.

Lens Actuating Module—Third Embodiment

Figure 9:
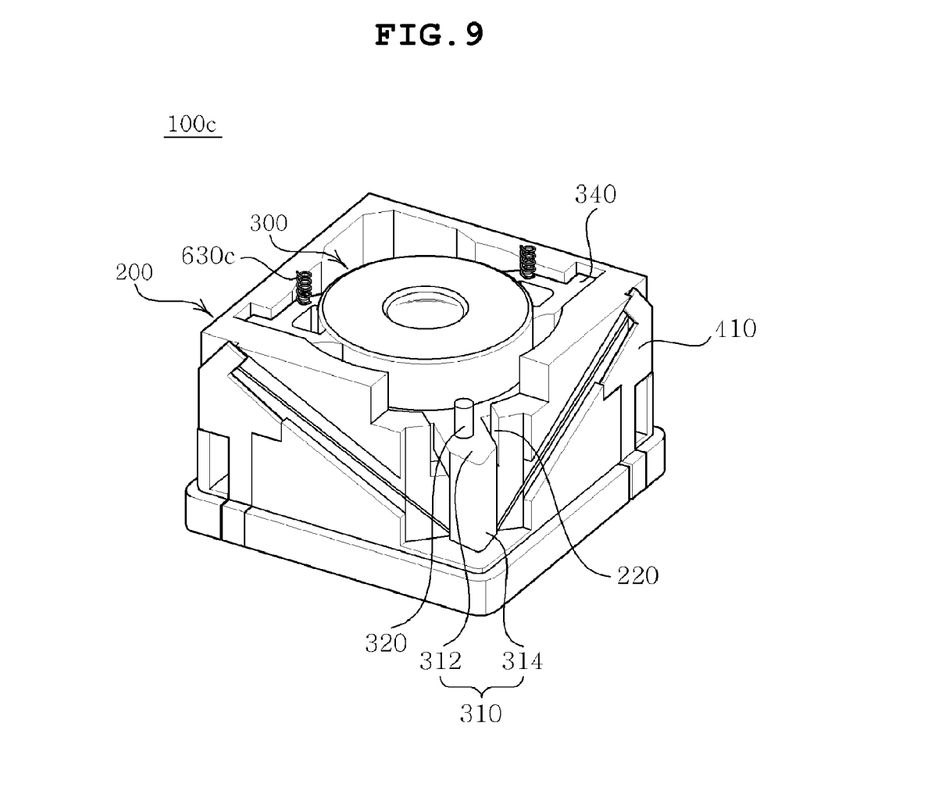
FIG. 9 is an exploded perspective view illustrating a lens actuating module according to a third embodiment of the present invention.
Figure 10:
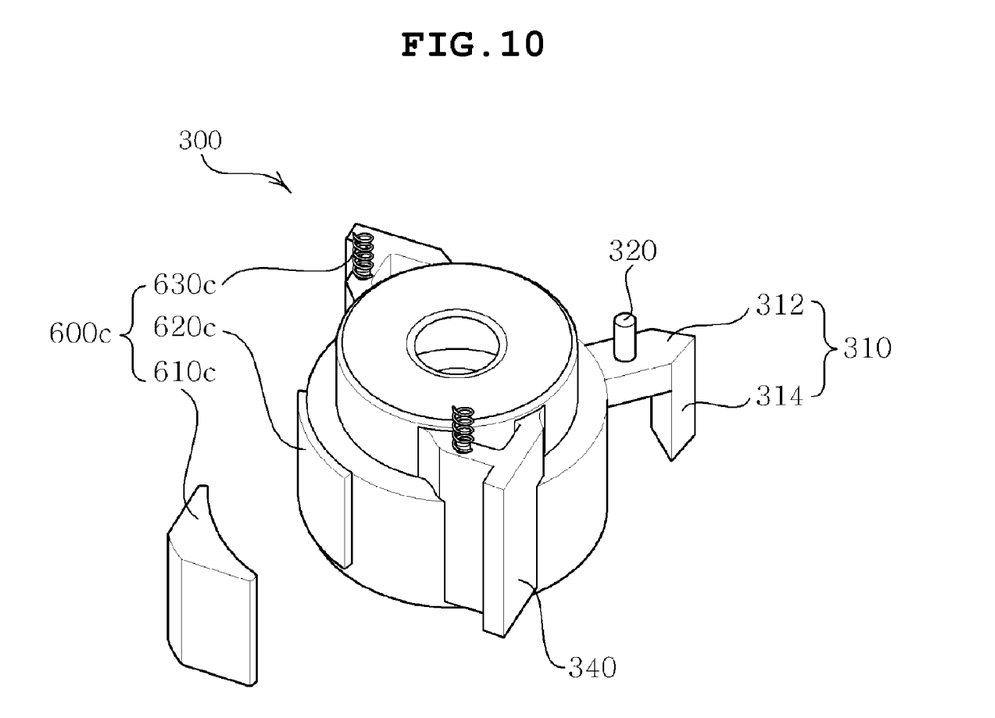
FIG. 10 is a perspective view illustrating the assembled state of a preload unit relative to a lens barrel of the lens actuating module of FIG. 9.

FIG. 9 is an exploded perspective view illustrating a lens actuating module according to a third embodiment of the present invention, and FIG. 10 is a perspective view illustrating the assembled state of a preload unit relative to a lens barrel of the lens actuating module of FIG. 9. Since the third embodiment is identical with the above-mentioned embodiments except for the construction of a preload unit 600c for the lens barrel, elements common to the embodiments will carry the same reference numerals and duplicate descriptions will be omitted herefrom. Hereinafter, a lens actuating module 100c according to this embodiment will be described with reference to the accompanying drawings.

As shown in FIGS. 9 and 10, the preload unit 600c of the lens actuating module 100c according to the third embodiment comprises a magnet 610c, a yoke 620c and elastic members 630c. The magnet 610c is provided on the inner circumference of the housing 200. The yoke 620c is provided on the outer circumference of the lens barrel 300 facing the inner circumference of the housing 200, and has a center which is equal to or different from the magnet 610c in the direction of the optical axis, with a magnetic attractive force acting between the yoke 620c and the magnet 610c. The elastic members 630c protrude from the upper surface of the lens barrel 300.

The magnet 610c and the yoke 620c function to apply a preload to the lens barrel 300 using the magnetic attractive force in the same manner as that described for the second embodiment. According to this embodiment, the elastic members 630c apply a force to the lens barrel 300 in a direction opposite to that of the pulling force of contraction of the SMA wire 400, so that the magnet 610c and the yoke 620c may be placed to have the same center or different centers. When the magnet 610c and the yoke 620c are placed to have the different centers, the magnet 610c and the yoke 620c apply a force to the lens barrel 300 in a direction opposite to that of the pulling force of contraction of the SMA wire 400 in cooperation with the elastic members 630c.

Here, each elastic member 630c protrudes from the upper surface of the lens barrel 300, and applies a force to the lens barrel 300 in the direction opposite to that of the pulling force of contraction using the elastic force of contraction of a casing which covers the housing 200 when the lens barrel 300 moves up. A coil spring may be used as the elastic member 630c.

Lens Actuating Module—Fourth Embodiment

Figure 11:
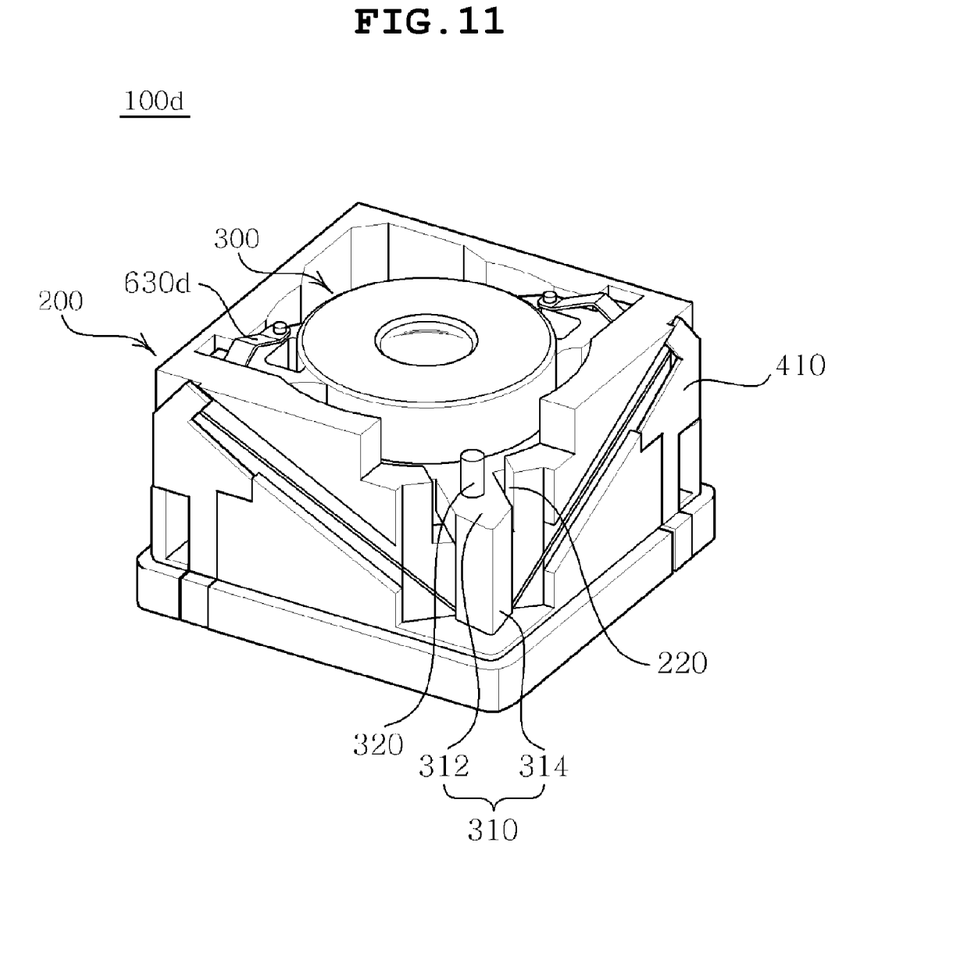
FIG. 11 is an exploded perspective view illustrating a lens actuating module according to a fourth embodiment of the present invention.
Figure 12:
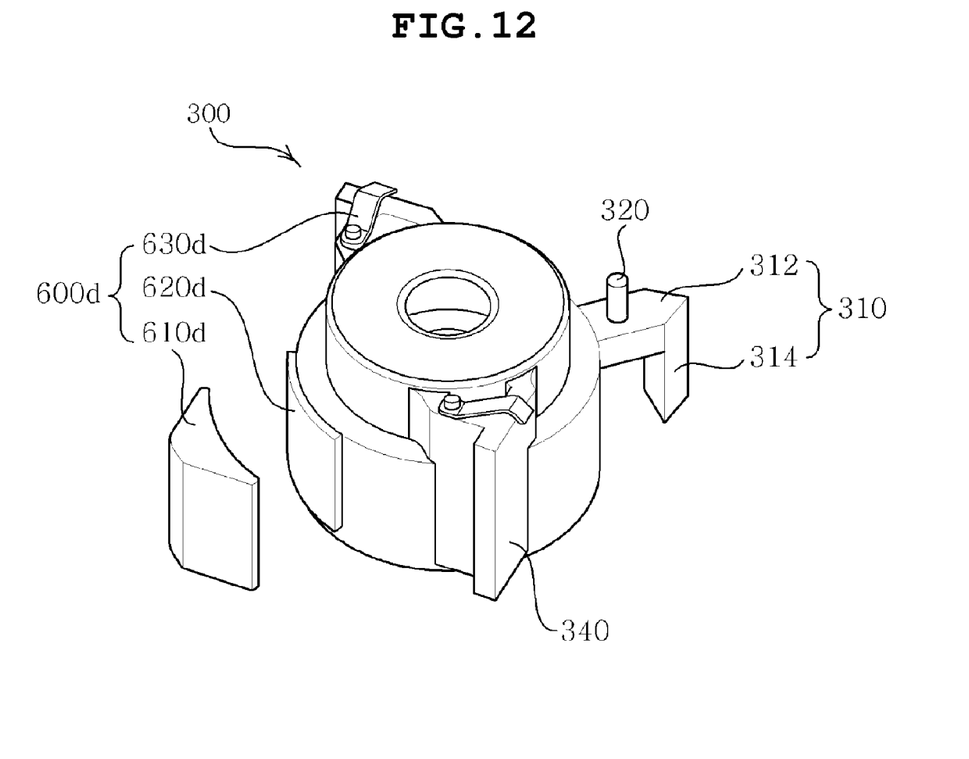
FIG. 12 is a perspective view illustrating the assembled state of a preload unit relative to a lens barrel of the lens actuating module of FIG. 11.

FIG. 11 is an exploded perspective view illustrating a lens actuating module according to a fourth embodiment of the present invention, and FIG. 12 is a perspective view illustrating the assembled state of a preload unit relative to a lens barrel of the lens actuating module of FIG. 11.

As shown in FIGS. 11 and 12, the lens actuating module 100d according to the fourth embodiment uses a plate spring as an elastic member 630d unlike the lens actuating module 100c according to the third embodiment. Here, since the plate spring performs the same function as the coil spring of the third embodiment, the detailed description of the plate spring will be omitted.

As described above, the present invention provides a lens actuating module, in which a lens barrel in a camera module is moved by the contracted or extended amount of a shape memory alloy wire, thus realizing a simple structure and miniaturization.

Furthermore, the present invention provides a lens actuating module, in which a rotary member such as a guide ball is interposed between a lens barrel and a housing to reduce a contact area, thus minimizing frictional force when the lens barrel is actuated vertically relative to the housing.

Further, the present invention provides a lens actuating module, in which a preload unit of a simple structure such as an elastic member and/or a magnet and a yoke provides a restoring force so that a lens barrel returns to its original position, and transmits a force for maintaining the contact of the lens barrel with a rotary member.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood as falling within the scope of the present invention.

What is claimed is:

1. A lens actuating module, comprising:
   a housing having an accommodating space;
   a lens barrel received in the accommodating space and including a lens;
   a driving unit applying a driving force such that the lens barrel is moved up in a direction of an optical axis, by a pulling force of contraction of an SMA (shape memory alloy) wire locked at both ends thereof to the housing;
   a rotary member interposed between the housing and the lens barrel; and
   a preload unit pulling the lens barrel in the direction of the optical axis such that the lens barrel is moved down to an original position, and pulling the lens barrel in a direction perpendicular to the optical axis such that a contact of the lens barrel with the rotary member is maintained.

2. The lens actuating module as set forth in claim 1, wherein the preload unit comprises an elastic member which is placed obliquely, with a first end thereof being locked to an inner circumference of the housing and a second end being locked to an outer circumference of the lens barrel.

3. The lens actuating module as set forth in claim 1, wherein the preload unit comprises:
   a magnet provided on an inner circumference of the housing; and
   a yoke provided on an outer circumference of the lens barrel which faces the inner circumference of the housing and having a center which is different from the magnet in the direction of the optical axis, with a magnetic attractive force acting between the magnet and the yoke.

4. The lens actuating module as set forth in claim 1, wherein the preload unit comprises:
   a magnet provided on an inner circumference of the housing;
   a yoke provided on an outer circumference of the lens barrel which faces the inner circumference of the housing and having a center which is equal to or different from the magnet in the direction of the optical axis, with a magnetic attractive force acting between the magnet and the yoke; and
   an elastic member protruding from an upper surface of the lens barrel.

5. The lens actuating module as set forth in claim 4, wherein the elastic member comprises a coil spring or a plate spring.

6. The lens actuating module as set forth in claim 1, further comprising:
   a crimp locked to an outer circumference of the housing, with the SMA wire connected at both ends thereof to the crimp which supplies an electric current to the SMA wire.

7. The lens actuating module as set forth in claim 1, further comprising:
   a barrel guide part protruding from an outer circumference of the lens barrel; and
   a housing guide part providing on an inner circumference of the housing and engaging with the barrel guide part so as to guide insertion and vertical actuation of the lens barrel.

8. The lens actuating module as set forth in claim 7, wherein the barrel guide part comprises a plurality of barrel guide parts, and the housing guide part comprises a plurality of housing guide parts.

9. The lens actuating module as set forth in claim 7, wherein he housing guide part comprises a rotary member receiving hole to receive the rotary member, and the barrel guide part is actuated in the direction of the optical axis by the driving force of the driving unit while the barrel guide part is in contact with the rotary member.

10. The lens actuating module as set forth in claim 1, wherein the lens barrel is provided with a barrel hook on the outer circumference thereof and part of the SMA wire between both ends is arranged to support the barrel hook.

11. The lens actuating module as set forth in claim 1, wherein the rotary member comprises a guide ball.

* * * * *